United States Patent Office 2,944,907
Patented July 12, 1960

2,944,907
RETARDING THE SPOILAGE OF MEAT PRODUCTS

Joseph F. Pagano, Bound Brook, Arthur E. Temple, Monmouth Junction, and Harold Yacowitz, Bound Brook, N.J., assignors to Olin Mathieson Chemical Corporation, New York, N.Y., a corporation of Virginia No Drawing. Filed May 7, 1957, Ser. No. 657,509

5 Claims. (Cl. 99—157)

This invention is concerned generally with the preservation of food products and more particularly with the retardation of spoilage of meats (including fish).

In order to fulfill today's increasing need for food, we must of necessity find methods of decreasing the amount of food wasted through distribution channels. The consumer in his quest for more fresh, lean juicy meat at the lowest possible price has caused the packer to build his supplying of the meat around artificial refrigeration and fast distribution. The refrigeration serves to decrease the amount of bacterial spoilage, which is ever present in supplying foodstuffs, particularly meats; but more efficient means of retarding spoilage are necessary to supplement the refrigeration.

It has been found that the use of anti-bacterial antibiotics in the treatment of meat can retard spoilage to a large degree but, such treatment has not been found to be effective in preventing the spoilage due to the presence and growth of yeasts and molds. The result of the yeast and/or mold growth is a disagreeable odor which makes the meat unpalatable and unsalable, thereby decreasing the amount of meat available for human consumption.

It is the object of this invention to provide a method of preserving foodstuffs, particularly meats (e.g. poultry) from spoilage due to bacterial contamination and/or yeast and mold growth.

It has been found that food spoilage, particularly that of meats, can be substantially decreased by applying to the surface of said food product a non-toxic antibacterial agent and an anti-fungal antibiotic of the group consisting of nystatin and amphotericin, preferably by dipping the food product in a liquid composition containing both the antibacterial agent and anti-fungal antibiotic in an aqueous vehicle. A preferred composition for this purpose contains of the order of 10 p.p.m. chlortetracycline, for example, as the anti-bacterial agent and about 2.5-20 p.p.m. of nystatin, for example (this range being based on nystatin with a potency of about 3500 units/mg., and being appropriately modified for nystatin of different potency). These antibiotics are non-toxic (in the amount required for effectiveness) non-volatile, odorless, and have a broad anti-fungal spectrum. The preparation and properties of these antibiotics are amply described in the literature. For example, nystatin is the subject of an article by Dutcher et al., entitled "The Preparation and Properties of Crystalline Fungicidin (Nystatin)," in Antibiotics Annual, 1953–1954, Medical Encyclopedia, Inc., New York, 1953, page 191; and amphotericin is described in an article by Gold et al., entitled "Amphotericins A and B, Antifungal Antibiotics Produced by a Streptomycete" in Antibiotics Annual, 1955–1956, Medical Encyclopedia, Inc., New York, 1956, page 579.

Further details of the practice and effect of the invention are given in the following examples, which, however, are not to be construed as limiting the invention.

EXAMPLE I

Laboratory-raised chickens, ranging in age from 6 to 10 weeks, were killed by bleeding and the legs were then removed, scalded and picked. The drumstick portion was then used in the dipping tests, each part being allowed to stand in the dip solutions for 1 to 2 hours at 5° C. The drumsticks were then packaged and stored in a cold room at 5° C. Samples were removed for initial bacterial, yeast and mold counts. Additional samples were removed periodically for odor tests and counts. Odor tests were conducted by members of a panel who had demonstrated ability to differentiate spoilage odors. Counts were made by dropping the drumstick in a flask containing sterile water and shaking 50 times. The water solution was then used for standard plate counts. Bacterial counts were done using Difco Yeast Beef Agar plus 100 micrograms of nystatin suspension per milliliter. Yeast and mold counts were done using Wort Agar containing 50 micrograms of chlortetracycline per milliliter. All plates were incubated at 37° C.

Table 1

BACTERIA (B), YEAST (Y) AND MOLD (M) COUNTS ON CHICKEN DRUMSTICKS DIPPED IN CHLORTETRACYCLINE SOLUTION

| Dip Solution | Initial Count Before Dipping | | Storage Time at 5° C.[1] | | | | | |
|---|---|---|---|---|---|---|---|---|
| | | | 10 Days | | 18 Days | | 27 Days | |
| | B | Y and M | B | Y and M | B | Y and M | B | Y and M |
| | Count in millions per drumstick [2] | | | | | | | |
| Tap water | 0.055 | -------- | 3.9 | 4.3 | 156 (slight odor) | 49 | 6,830 (putrid) | 215 |
| Tap water plus 23 p.p.m. chlortetracycline hydrochloride | -------- | -------- | .006 | 1.7 | .017 (yeasty) | 233 | 0.13 (yeasty) | 1,300 |

[1] Packaged in cellophane, three drumsticks per package.
[2] Three drumsticks pooled for each count.

Table II

BACTERIA (B), YEAST (Y) AND MOLD (M) COUNTS ON CHICKEN DRUMSTICKS DIPPED IN CHLORTETRACYCLINE AND CHLORTETRACYCLINE-NYSTATIN SOLUTIONS

|  | Count After 15 Days' Storage at 5° C.[1] | | |
| --- | --- | --- | --- |
|  | Bacteria | Yeast and Molds | Average Odor Score [2] |
|  | Count in millions per drumstick [3] | | |
| Tap water | 23.0 | 1.3 | 1.2. |
| Tap water plus 5 p.p.m. chlortetracycline hydrochloride | .05 | 4.3 | sl. yeast. |
| Tap water plus 10 p.p.m. chlortetracycline hydrochloride | .03 | 2.7 | sl. musty. |
| Tap water plus 5 p.p.m. chlortetracycline hydrochloride plus 5 p.p.m. nystatin | .3 | .05 | 0.2. |
| Tap water plus 10 p.p.m. chlortetracycline hydrochloride plus 5 p.p.m. nystatin | .035 | .01 | 0.3. |

[1] Packaged in Pliofilm, one drumstick per package.
[2] Odor score: 0=no odor; 0.5=very slight odor; 1.0=slight odor; 2=moderate to strong odor; 3=putrid. Three drumsticks tested per treatment.
[3] One drumstick per count.

It is to be noted that while chlortetracycline was effective in retarding spoilage as evidenced by the reduced bacterial count and odors, a pronounced increase in yeast and mold counts was observed, resulting in yeasty and musty odors. But, when chicken parts were dipped in an aqueous vehicle containing both chlortetracycline and nystatin, a marked decrease in yeast and mold counts and odors as well as a decrease in bacterial count was observed.

It has been further found that nystatin (as well as amphotericin) does not penetrate the outer surface of the meats treated, that is, is present only on the surface of said meats. Such inability to penetrate facilitates the inactivation of the antifungal agent during the cooking process.

EXAMPLE II

Experiments were conducted in which various nystatin solutions were placed in stainless steel cups, the bottoms of which were sealed with a piece of chicken skin or a 0.5 mm. section of chicken breast muscle. The skin or muscle sections were fastened to the metal cups with thread. These cups, along with suitable controls, were placed on agar plates seeded with the test organism, *Saccharomyces cerevisiae*. Little or no diffusion of nystatin through chicken skin or breast muscle occurred. This indicated that nystatin was present only on the surface of the chicken parts. Since yeasts and molds normally grow on exposed surfaces, the localization of nystatin on the skin and muscle surfaces affords antifungal protection at the site most likely to be contaminated.

EXAMPLE III

It was found that the residues of nystatin remaining on the treated parts could be removed from the surface of the meat by repeated water washings using small volumes of water, and that the nystatin is inactivated during the cooking process; the nystatin being rapidly inactivated in boiling water.

Table III

BACTERIA (B), YEAST (Y) AND MOLD (M) COUNTS AND ODOR TESTS ON CHICKEN WINGS DIPPED IN CHLORTETRACYCLINE AND CHLORTETRACYCLINE-NYSTATIN SOLUTIONS

| Dip Solution | Initial Count Before Dipping | | Storage Time at 5° C.[1] | | | | | |
| --- | --- | --- | --- | --- | --- | --- | --- | --- |
|  |  |  | 7 Days | | Average Odor Scores [2] | 13 Days | | Average Odor Score |
|  | B | Y and M | B | Y and M |  | B | Y and M |  |
|  | Count in millions per wing [3] | | | | | | | |
| Tap water | 7.3 | 0.014 | 1,419 | 0.158 | 3 | 2,300 | .225 | 3. |
| Tap water plus 10 p.p.m. chlortetracycline hydrochloride | | | 8.8 | 32.0 | sl. yeasty | 617 | 104.0 | yeasty. |
| Tap water plus 10 p.p.m. chlortetracycline hydrochloride plus 1.25 p.p.m. nystatin | | | 36.0 | 7.8 | .25 | 1,110 | 99.0 | yeasty. |
| Tap water plus 10 p.p.m. chlortetracycline hydrochloride plus 2.5 p.p.m. nystatin | | | 8.3 | 1.7 | 0 | 2,512 | 84.5 | yeasty. |
| Tap water plus 10 p.p.m. chlortetracycline hydrochloride plus 5.0 p.p.m. nystatin | | | 18.5 | .465 | 0 | 967 | 52.0 | 0. |
| Tap water plus 10 p.p.m. chlortetracycline hydrochloride plus 10 p.p.m. nystatin | | | 13.0 | .068 | 0 | 220 | 4.7 | .25. |

[1] Packaged in Pliofilm, two wings per package.
[2] See footnote Table II for scoring system. Two packages tested per treatment.
[3] Two wings per package, data represent average counts on two packages.

NOTE.—These tests were conducted using fresh chicken wings purchased from a commercial processing plant in the same manner as the tests in which the chicken legs were used. The chicken wings arrived packed in ice and had a relatively high initial count which resulted in rapid spoilage.

Table IV

RESIDUAL NYSTATIN ON WHOLE UNCOOKED CHICKEN

| Portion of Chicken [1] | Weight of Portion in Grams | Nystatin Concentration | |
| --- | --- | --- | --- |
|  |  | Micrograms per Gram | Micrograms per Portion |
| Skin |  | 4.0 |  |
| Neck | 121 | 0.5 | 60.5 |
| Wing | 124 | 0.5 | 62.0 |
| Thigh | 132 | 0.2 | 26.4 |
| Drumstick | 127 | 0.3 | 38.1 |

[1] Held for 4.5 hours in a nystatin solution containing 10.3 gamma (34 units) per ml. at 5° C.

*Table V*

INACTIVATION OF NYSTATIN ON CHICKEN SKIN IN BOILING WATER

| Initial Concentration of Nystatin, Micrograms per ml. | Concentration After 20 Minutes Boiling, Micrograms per ml. | Concentration After 40 Minutes Boiling, Micrograms per ml. |
|---|---|---|
| 12.5 | 0.9 | <0.6 |

By use of the method of this invention, the deterioration of foodstuffs, particularly meats, due to bacteria, yeasts and molds can be substantially reduced, thereby decreasing the volume of food loss to the public. It should also be noted that the method of this invention makes use of materials which are non-toxic to the ultimate consumer, even if not completely inactivated during the cooking of the foods.

This invention may be variously otherwise embodied within the scope of the appended claims.

What is claimed is:

1. A method of retarding the spoilage of meats which essentially comprises dipping the meat in an aqueous solution essentially comprising chlortetracycline in a concentration of at least 5 parts per million; and nystatin in a concentration of at least 2.5 parts per million.

2. The method of claim 1, in which the chlortetracycline concentration is of the order of 10 p.p.m.

3. The method of claim 2, wherein the concentration of the nystatin is about 2.5–20 p.p.m.

4. A method of retarding the spoilage of meats which essentially comprises applying to the surface thereof a mixture comprising a non-toxic anti-bacterial agent and an anti-fungal antibiotic selected from the group consisting of nystatin and amphotericin, the anti-bacterial agent being present in a concentration of at least 5 parts per million and the anti-fungal antibiotic being present in a concentration of at least 2.5 parts per million.

5. A method of retarding the spoilage of meats which essentially comprises dipping the meat in an aqueous composition containing a non-toxic anti-bacterial agent and an anti-fungal antibiotic selected from the group consisting of nystatin and amphotericin, the anti-bacterial agent being present in a concentration of at least 5 parts per million and the anti-fungal antibiotic being present in a concentration of at least 2.5 parts per million.

References Cited in the file of this patent

UNITED STATES PATENTS

| | | |
|---|---|---|
| 2,744,136 | Gregory | May 1, 1956 |
| 2,766,124 | Upham et al. | Oct. 9, 1956 |
| 2,786,768 | Deatherage | Mar. 26, 1957 |
| 2,797,183 | Hazen et al. | June 25, 1957 |

OTHER REFERENCES

Science, May 29, 1953, pages 609 and 610.

"Phytopathology," February 1956, pp. 105 to 111, inclusive, article entitled Increasing the Absorption of Streptomycin by Leaves and Flowers with Glycerol, by R. A. Gray.